Oct. 19, 1965     M. A. FERGUSON     3,213,258
ELECTRICAL STOCK REMOVAL METHOD AND APPARATUS
Filed May 15, 1962
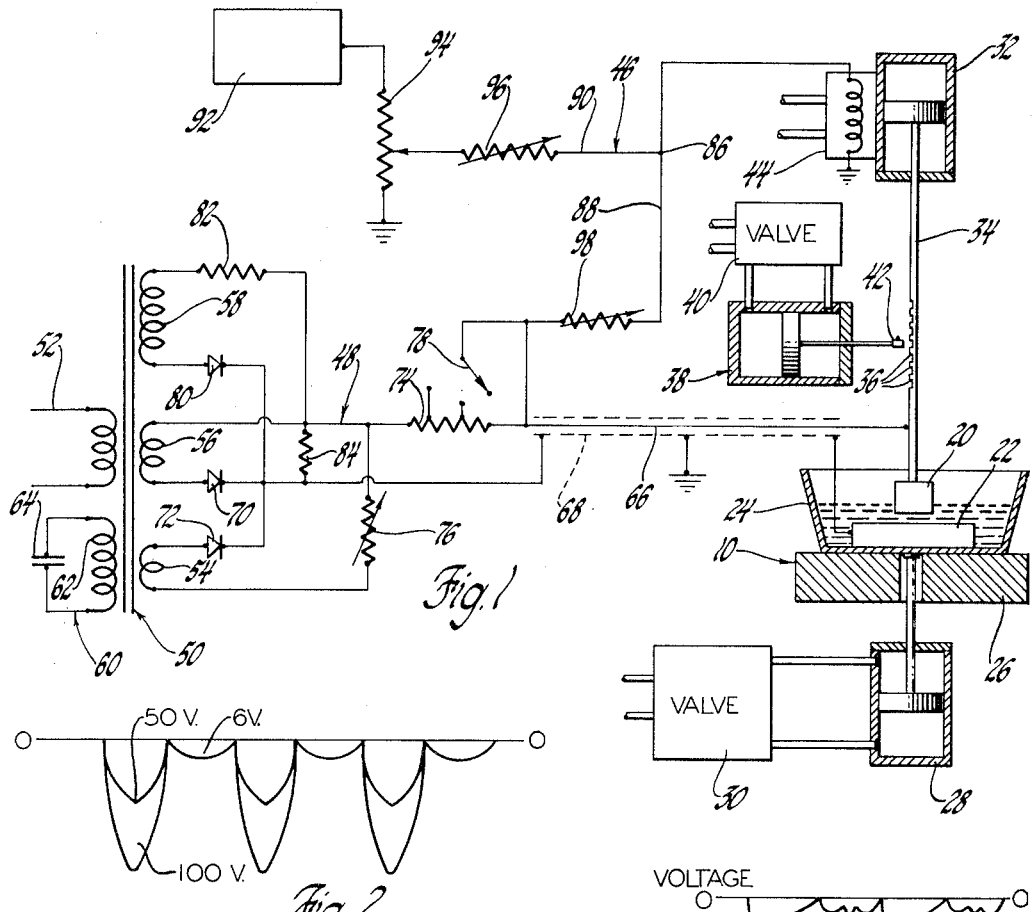
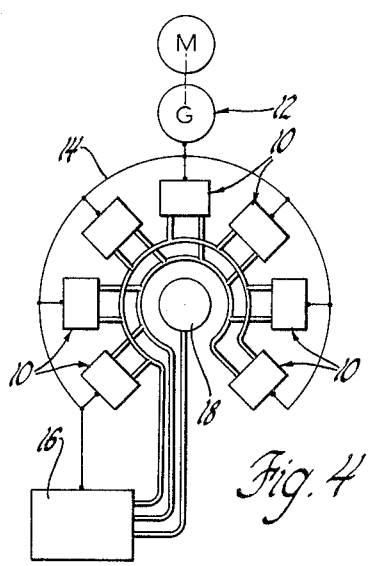
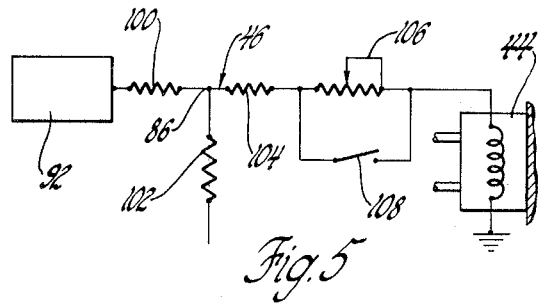
INVENTOR:
Millard A. Ferguson
BY
Hugh L. Fisher United States Patent Office 3,213,258
Patented Oct. 19, 1965

3,213,258
ELECTRICAL STOCK REMOVAL METHOD
AND APPARATUS
Millard A. Ferguson, Utica, Mich., assignor to General Motors Corporation, Detroit, Mich., a corporation of Delaware
Filed May 15, 1962, Ser. No. 194,899
17 Claims. (Cl. 219—69)

This invention relates to improvements in methods and apparatus for electrical stock removal.

The process of electrically removing stock from a conductive workpiece, such as that commonly known as Electrical Discharge Machining, affords certain advantages over the more conventional ways of removing stock. But, in many applications of the process, low stock removal rates and reduced cutting tool life can often negate these advantages. Even if the rates can be and are increased, the resultant finish can become rougher than is usually wanted. And too, dimensional control becomes more difficult to maintain as the machining rate increases.

As for cutting tool life, it becomes a particular concern when machining complex shapes. These more complex shapes necessarily require that the cutting tool be formed of a corresponding shape thus increasing the costs of making the cutting tool. If the cutting tool wears excessively, the replacement costs become a significant factor in evaluating any proposed uses of the process.

With the foregoing in mind, the invention contemplates novel electrical stock removal method and apparatus for reducing the wear of the cutting tool electrode.

Another purpose of the invention is to increase the machining rate in a unique way and while consuming a minimum of power.

Other aims of the invention include the provision of a versatile gap spacing control whose responsiveness is easily adjusted, and the effective utilization of each cycle of a full wave rectified voltage from a power source.

In carrying out the invention according to a preferred embodiment thereof, energy from a source is supplied to the gap so that low power at a high voltage, high power at a lower voltage, and a burning current voltage are successively applied to the gap to produce initially a gap ionization, next a high current electrical stock removing discharge, and then the gap is maintained ready to conduct at a voltage level less than required for a true gap breakdown. Also, the energy from the source is efficiently stored so as to reduce the influence of gap load variations on the source.

The foregoing and other objects and advantages of the invention will become apparent from the following description and the accompanying drawings in which:

FIGURE 1 is a combined schematic and circuit diagram of an embodiment of the invention;

FIGURES 2 and 3 are graphs illustrating, respectively an open circuit gap voltage and normal cutting gap voltage;

FIGURE 4 is a block diagram depicting an arrangement of several of the FIGURE 1 apparatuses, each utilizing the same power source; and FIGURE 5 is a circuit diagram of a modification of the FIGURE 1 gap spacing control.

Referring now to the drawings in detail, and initially to FIGURE 4, a series of electrical stock removal machines designated generally by the numeral 10 are shown arranged in circular fashion; in this instance there are six machines each utilizing the process known as Electrical Discharge Machining. Machines 10 are all supplied electrical power by a single motor-generator set 12 through a common distribution bus 14. Also, the machines 10 all are supplied through a control panel 16 with dielectric fluid from a common supply reservoir 18. This arrangement permits a single operator to operate all six machines and eliminates much of the duplication such as having individual motor-generator sets 12 and reservoirs 18 for each machine 10.

Since each of the machines 10 is substantially the same, only an exemplary one illustrated in FIGURE 1 will be described. As depicted in FIGURE 1, a pair of conductive electrodes, which will hereinafter be referred to as a cutting tool 20 and a work piece 22, are spaced apart so as to form a machining gap therebetween. The workpiece 22 is positioned within a tank 24 in which a suitable dielectric fluid flows. The level of the fluid should be adequate to insure that the gap is always filled. Any known provision may be made for circulating the dielectric fluid through the gap. This provision may include filtering if needed.

The tank 24 is situated on a table or a machine base 26 and may be meneuvered up and down as by a pressure fluid operated tank motor 28. The tank motor 28 can be manually controlled by a valve 30 of the usual type so that pressure fluid is delivered to or exhausted from the opposite end of the motor 28 as required. The tank motor 28 offers flexibility of operation since the tank 24 and the workpiece 22 can be moved up and down to whatever position is needed either for initially establishing the desired machining gap, for changing the level of the dielectric fluid, or for allowing different workpieces to be installed or removed.

With the FIGURE 1 embodiment and during the machining process, the cutting tool 20 is maneuvered relative to the workpiece 22 to maintain optimum gap spacing. This is done by a cutting tool motor 32 of any known kind, such as the fluid pressure operated piston motor illustrated. It should be kept in mind that other type arrangements may be made for moving the cutting tool 20. Also, the workpiece 22 can be moved instead of the cutting tool 20.

A spindle 34, which interconnects the cutting tool motor 32 and the cutting tool 20, is provided with a series of notches 36. These notches 36 coact with a safety lock motor 38, which also may be of the fluid pressure operated piston type, to lock the cutting tool 20 in any selected position. The safety lock motor 38 may be controlled manually or automatically by an appropriate valve 40 so that a lock end 42 formed at the extremity of the motor piston rod may be moved into and out of engagement with one of the notches 36 as determined by the desires of the machine operator.

The supply of fluid pressure to the cutting tool motor 32 is controlled by a force motor and servo valve assembly designated generally by the numeral 44. One such assembly 44 is shown and described in the U.S. Patent 3,059,150 to Colten et al. The force motor and servo valve assembly 44, as will become more apparent, is operated by a gap spacing control circuit viewed generally at 46.

The machining gap is provided with power by a power supply circuit shown generally at 48. The power supply circuit 48, as mentioned, derives its power from the motor-generator set 12 via the distributor bus 14. The coupling between the power supply circuit 48 and the distributor bus 14 is made through an iron core transformer 50. The transformer 50 includes a primary winding 52 that is electrically connected to the distributor bus 14 and a series of secondary windings, which will hereinafter be referred to as a burning current voltage winding 54, a main gap voltage winding 56, and a firing or supplementary voltage winding 58. The transformer 50 also includes a tank circuit 60 comprising a winding 62 and a capacitor 64. The capacitor 64 is tuned to near resonance with the distributing bus frequency and therefore draws enough leading current so that at full output, which corresponds to a maximum cutting rate, the load to the motor-generator set 12 is at approximately unity power factor. This affords optimum generator loading. Additionally, the tank circuit 60, as will be appreciated, stores energy and when required applies this to the windings 54, 56, and 58.

The windings 54 and 56 are each connected across the gap by a conductor 66, which is electrically connected to the cutting tool 20, and a grounded coaxial cable 68, which is electrically connected to the workpiece 22. The outputs of the two windings 54 and 56 have unidirectional conducting devices such as rectifiers 70 and 72 so poled as to provide a modified full-wave rectified voltage of negative polarity to the gap. This rectified gap voltage with an open circuit appears as shown in FIGURE 2. During one half-cycle, the open circuit gap voltage derived from the gap voltage winding 56 will be approximately a negative 50 volts. During the next half-cycle, the open circuit gap voltage will be provided by the burning current voltage winding 54 and will be approximately 6 volts.

The foregoing voltage values are intended to be exemplary only. Different conditions, of course, would demand other voltage values. For this reason, provision is made for altering the gap voltage and the burning current voltage by adjusting series resistors 74 and 76. The resistance of the series resistor 74 is controlled by a manually or automatically operable selector switch 78 and permits control of both finish and overcut. By increasing the resistance of the resistor 74, the net gap voltage will be reduced and accordingly the stock removal rate. This provides a finer finish and permits closer control of overcut, i.e., the extent that the workpiece 22 has been machined oversize. On the other hand, if the resistance of the resistor 74 is a minimum, stock removal rate will be a maximum and the finish somewhat coarser. Additionally, the resistor 74 serves to isolate the cutting gap from the distributor bus 14. Consequently, when short circuits occur in the gap, the resultant increased and often excessive voltage is dropped across this resistor 74.

The desirability for increasing the life of the cutting tool 20 has been previously discussed. At that time it was mentioned that this is particularly a desirable objective when a costly and complex cutting tool 20 is being employed. This increased life is achieved in the preferred embodiment by applying the burning current voltage of the value determined by the adjustable series resistor 76 across the gap during the half-cycles between the main gap voltage or machining cycles. The level of this burning current voltage is adjusted by the resistor 76 so as to be always less than required to produce a true gap breakdown but sufficient to cause a so-called burning current to flow through the gap as particles cause direct shorts. As a consequence, the products of a discharge remaining in the gap and tending to form bridges across the gap are melted. These melted particles react with the gas produced by the cracking of the dielectric fluid during the discharge and form a hardened carbide layer of material on the exterior surface of the cutting tool 20. This layer of material, by way of example, on copper, zinc, zinc-tin, and aluminum cutting tools, has been found to be very hard and more difficult to hand file than the cutting tool material itself. By utilizing this burning current, cutting tools can be made of the easily cast materials and still achieve good wearing qualities, formerly only obtainable with a few of the high melting point and difficult to cast materials, such as copper-tungsten. The technique results in a substantial saving in materials and renders the electrical discharge machining process now suitable for many additional machining operations that previously were avoided because of the expense involved.

The firing voltage winding 58 is employed to initially supply low power to the gap at a relatively high voltage so as to initiate a gap breakdown or ionization. This high voltage initiation aids in obtaining an electrical discharge each machining cycle. Hence, the machining rate can be substantially increased. Without high voltage initiation, very often there will be, for different reasons, many cycles when no discharge will occur.

To obtain this firing voltage, which for purposes of demonstration only, may be a minus 100 volts with no load, the firing voltage winding 58 is connected in series with a unidirectional conducting device such as a rectifier 80 and a current limiting resistor 82. Additionally, the winding 58 is connected across a parallel resistor 84 as is the gap voltage winding 56. Therefore, the firing voltage winding 58 is connected across the gap in the same way as the gap voltage winding 56.

Because only the negative high voltage cycles are to be applied across the gap, the positive half cycles are discarded by the rectifier 80. Too, once the firing voltage is applied across the gap and the gap ionizes, the firing voltage is quickly reduced. This is accomplished by the two resistors 82 and 84, which together constitute a voltage dividing network. The values of the resistors 82 and 84 are selected so that most of the firing voltage appears across the resistor 84 and the gap, whereas the resistor 82 limits the current supplied by the firing voltage winding 58 to a small amount. Once the gap ionizes, current starts to flow through the gap and the firing voltage winding 58 commences to supply more current until the resultant voltage drop across the resistor 82 when deducted from the firing voltage, causes the voltage appearing across the resistor 84 to approximate the main gap voltage from the gap voltage winding 56. The main gap voltage winding 56 supplies more current at this time because the impedance path is lower than that provided for the firing voltage winding current, which, as mentioned, is limited by the resistor 82. For example and without limitation, if the total current furnished by the windings 56 and 58 is 150 amps., the firing voltage winding 58 would only supply approximately 2 amps. Consequently, the main gap voltage winding 56 furnishes most of the electric discharge machining power at a lower voltage.

FIGURE 3 illustrates the cutting gap voltage appearing across the gap. As illustrated, initially the voltage across the gap rises quickly until a breakdown occurs after which the gap voltage reduces to an amount determined by the main gap voltage winding 56, the resistor 74, and the conditions of the gap, e.g., kind of dielectric fluid, electrode materials, and amount of current flow. Gap voltage decreases further during the half-cycle until the voltage supplied by the burning current voltage winding 54 is applied to commence the next half-cycle. As can now be appreciated, by utilizing the firing voltage, the resistor 74 can be of a smaller ohmic value, there being no need for the usual substantial drop in the source voltage before being applied to the gap. The necessity for this large voltage reduction, e.g., from a 100 volt peak to a 50 volt peak, was to insure that an adequate voltage was always available at the gap. Therefore, the source voltage had to be considerably higher than the voltage applied to the gap. With a resistor of smaller ohmic value, the power losses are reduced and the machine becomes more efficient because more of the input power is utilized during the actual machining. In other words, the same cutting current can be applied to the gap but through a resistor of lower ohmic value and hence, the power loss is less. Once the firing voltage has ionized the gap, only a voltage adequate to maintain the gap active or alive is needed.

The gap spacing control circuit has a summing junction 86 to which current is supplied both by a conductor 88 at a voltage corresponding to gap voltage and by a conductor 90 at a reference voltage corresponding to the desired gap spacing. This reference voltage is derived from a source 92 and can be varied by an adjustable resistor 94.

The operation of the gap spacing control circuit can best be explained by utilizing actual values, which are for purposes of explanation only. If the voltage derived from the gap and applied to the summing junction 86 is a minus 40 volts and this corresponds to the gap spacing wanted, then the reference voltage applied to the summing junction 86 should be a positive 40 volts so that there will be no error signal or control signal voltage applied to the force motor and servo valve assembly 44. Thereafter, as stock is eroded from the workpiece 22 due to the electrical discharges across the gap, the gap voltage will increase because the gap spacing will increase. Consequently, the gap voltage applied to the summing junction 86 will become more negative, e.g., a minus 60 volts, so that when compared with the reference voltage, a minus 20 volt control signal will be developed and applied to the assembly 44. This negative control signal will cause the cutting tool motor 32 to advance the cutting tool 20 towards the workpiece 22 until the desired gap is again re-established.

The gap spacing control circuit 46 includes a desirable feature that permits the rate at which the cutting tool 20 is moved up and down by the cutting tool motor 32 to be controlled. To achieve this control, up and down variable sensitivity resistors 96 and 98 are installed, respectively, in the conductors 90 and 88. If the ohmic value of the up sensitivity resistor 96 is increased, the reference voltage applied to the summing junction 86 will be decreased; hence, if a proper balance is to be maintained between the reference and gap voltages as applied to the summing junction 86 to achieve the desired gap spacing, the gap voltage applied to the summing junction 86 must also be reduced by changing the setting of the down sensitivity resistor 98. As a consequence, when the gap spacing becomes less than desired, the difference between the smaller reference and gap voltages, is less for a certain error in the gap spacing. This reduced error signal will, when applied to the assembly 44, cause the cutting tool motor 32 to move or withdraw the cutting tool 20 relative to the workpiece 22 at a slower rate. In other words, if originally the sensitivity resistors 96 and 98 were adjusted so that a control signal of 8 volts was applied to the assembly 44, this differential could be reduced to 4 volts by readjusting the sensitivity resistors 96 and 98, and therefore, the rate at which the tool 20 was withdrawn would be correspondingly reduced.

With this arrangement, the down sensitivity of the cutting tool motor 32 is adjusted in substantially the same way. If the minus 40 volts suggested by way of example in the description of the up sensitivity is to be reduced to say a minus 20 volts by adjusting the resistor 98, then of course the resistor 96 has to be adjusted so that the net error or control voltage will be zero. If now the gap spacing increases hte minus 20 volts will also increase but the net differential will be less, e.g., 4 volts instead of 8 volts when a minus 40 volts was employed and the cutting tool motor 32 will therefore feed the cutting tool 20 downwardly at a slower rate.

The individual adjustments of the up and down sensitivity resistors 96 and 98 do influence each other. However, this is not to the same extent because each has a different impedance path for the current from the gap and the current from the source 92.

To summarize the operation of the individual machines 10, assume that the motor-generator set 12 is operative, the workpiece 22 is in place, and the cutting tool 20 is at the desired distance from the workpiece 22. As mentioned, the tank motor 28 can be operated so that the tank 24 is moved up and down and accordingly the workpiece 22 to whatever position desired. The firing voltage winding 58 will initially apply a low power at a high voltage to the gap to produce the gap breakdown or ionization and start conduction; thereafter, the high voltage will reduce until the main gap voltage winding 56 becomes effective to provide a higher power adequate for the process and at a lower voltage. In other words, the first half of the cycle commences when a high voltage is applied across the gap from the firing voltage winding 58. Only a small amount of current will flow at this time. As soon as the gap is conductive, a larger amount of current will be supplied from the gap voltage winding 56 at a reduced voltage. At the completion of this half cycle, the burning current voltage winding 54 is effective and maintains the gap at a substantially reduced voltage, adequate to produce the aforementioned burning for causing the hardened layer of material to be formed on the exterior of the cutting tool 20. This reduced voltage causes the gap to be prepared to conduct if particles are present in the gap.

If during operation, a short occurs, or the cutting tool 20 approaches too closely to the workpiece 22, the gap voltage will decrease, whereupon the reference voltage will dominate when summed at the junction 86. Consequently, the net error signal will be positive and when applied to the force motor and servo valve assembly 44 will cause the cutting tool motor 32 to retract the cutting tool 20 the amount required for the gap to be cleared or the gap re-established. If the gap has been cleared, the gap voltage will have increased to a point where it is greater than the reference voltage, and a negative error signal will be supplied to the assembly 44. This negative error signal will cause the cutting tool motor 32 to feed the cutting tool 20 toward the workpiece 22 until the desired gap is re-established. The rate of retraction and feed is of course controlled, as discussed, by the sensitivity resistors 96 and 98.

In the FIGURE 5 modified gap spacing control circuit 46, fixed resistors 100 and 102 are installed between the summing junction 86 and the reference voltage source 92 and the gap, respectively. Between the summing junction 86 and the assembly 44, a fixed resistor 104 and a variable resistor 106 are installed. A switch 108 permits the variable resistor 106 to be shunted if desired. The variable resistor 106 permits the error signal to be increased or decreased as desired and this as has been explained causes the rate at which the motor 32 moves the cutting tool 20 up and down to be altered. When the switch 108 is closed, the error signal will have its maximum value, and therefore the rate of cutting tool movement will be correspondingly maximum.

From the foregoing, it will be appreciated now that provision has been made for achieving maximum rates of machining by utilizing a firing voltage to insure that a discharge occurs during each machining cycle of operation. This enables more of the input power to be used and hence, the process is rendered more efficient. The unbalanced full wave rectification provision increases the wearing qualities of the cutting tool 22 by maintaining the gap ready to conduct during the half-cycles between the machining cycles. Additionally, the rate of relative movement between the cutting tool 20 and the workpiece 22 can be conveniently varied as well as finish and overcut.

The invention is to be limited only by the following claims.

I claim:

1. The method of electrical stock removal by a series of time spaced stock removing electrical discharges across an ionizable gap between conductive workpiece and cutting tool electrodes with energy derived from an A.C. source, comprising the steps of converting the energy during one half-cycle of the source into a cutting voltage pulse of a certain amplitude for application to the gap so as to produce the stock removing discharge and converting the energy during the other half-cycle of the source into a burning current voltage pulse of the same polarity as the cutting voltage pulse and of a lesser magnitude for application to the gap so as to maintain the gap voltage at a level less than required for a true gap breakdown and thereby cause a hardened layer of material to be formed on the exterior surface of the cutting tool electrode for inhibiting wear of the cutting tool electrode.

2. The method of electrical stock removal by a series of time spaced stock removing electrical discharges across an ionizable gap between conductive workpiece and cutting tool electrodes with energy derived from an A.C. source, comprising the steps of converting the energy during one half-cycle of the source initially into a firing voltage pulse of a certain amplitude and then into a machining voltage pulse of a lesser amplitude than the certain amplitude of the firing voltage pulse both for application to the gap so as to respectively initiate a gap breakdown and complete the electrical stock removing discharge and converting the energy during the other half-cycle of the source into a burning current voltage pulse of the same polarity as the machining voltage pulse and of a lesser magnitude than the machining voltage pulse for application to the gap so as to maintain the gap voltage at a level less than required for a true gap breakdown and thereby cause a hardened layer of material to form on the exterior of the cutting tool electrode for reducing the wear of the cutting tool electrode.

3. In electrical stock removal apparatus, the combination of conductive tool and workpiece electrodes spaced apart so as to form an ionizable gap therebetween, an A.C. source providing both a cutting voltage of a certain magnitude for producing a stock removing discharge across the gap and a burning current voltage of a lower magnitude than the certain magnitude of the cutting voltage, means coupling the cutting voltage and the burning current voltage across the gap, the coupling means including means phase relating the cutting voltage and the burning current voltage so that during one half-cycle of the source the cutting voltage is applied to the gap and during the next half-cycle of the source the burning current voltage is applied to the gap for maintaining the gap ready to conduct so as to cause any material within the gap to melt and form a hardened layer of material to be formed on the exterior of the cutting tool electrode thereby inhibiting the wear of the cutting tool electrode.

4. In electrical stock removal apparatus, the combination of conductive tool and workpiece electrodes spaced apart so as to form a dielectric fluid filled gap therebetween, a source of alternating current voltage, a transformer having a primary winding connected to the source and a secondary winding, a full wave rectifier so connected between the secondary winding and the gap as to cause during the first half-cycle of the source a cutting voltage pulse to be applied to the gap for producing a breakdown so as to effect intermittent stock removing discharges across the gap and during the next half-cycle of the source a burning current voltage pulse of the same polarity as the cutting voltage pulse to be applied to the gap for maintaining the gap ready to conduct at a voltage level less than required for a true gap breakdown so as to cause any material within the gap to melt and form a layer of hardened material on the cutting tool electrode.

5. In electrical stock removal apparatus, the combination of conductive tool and workpiece electrodes spaced apart so as to form an ionizable gap therebetween, a source of alternating current voltage, means coupling the source to the gap and arranged to provide first and second in-phase voltages, means full-wave rectifying the first and second voltages so that on alternate half-cycles first and second unidirectional voltage pulses are applied across the gap, the first voltage pulse being applied to the gap on the initial half-cycle and being of an amplitude sufficient to produce a gap breakdown and cause a stock removing electrical discharge across the gap, the second voltage pulse being applied to the gap on the next half-cycle so as to maintain the gap ready to conduct at a voltage level less than that of the first voltage and thereby cause any particles within the gap to melt and form a hardened layer of material on the cutting tool electrode for inhibiting wear thereof.

6. In electrical stock removal apparatus, the combination of conductive tool and workpiece electrodes spaced apart so as to form a dielectric fluid filled gap therebetween, a source of alternating current voltage, a transformer having a primary winding energized by the source and first and second secondary windings each connected across the gap so as to provide respectively first and second in-phase voltages, and means rectifying the first and second voltages from the first and second windings, the rectifying means including a pair of rectifiers one associated with the first winding and the other with the second winding and so poled as to produce from the first and second voltages a full-wave rectified output voltage having a voltage level on one half-cycle of the source sufficient to produce an ionization of the dielectric fluid filled gap and initiate an electrical stock removal discharge thereacross and on the other half-cycle of the source to maintain the gap ready to conduct at a voltage level less than required to produce a true gap breakdown so that any material within the gap will melt to form a hardened layer of material on the cutting tool electrode for inhibiting wear of the cutting tool electrode.

7. In electrical stock removal apparatus, the combination of conductive tool and workpiece electrodes spaced apart so as to form an ionizable gap therebetween, an A.C. source of electrical energy having a certain frequency, means alternately supplying from the source low power at a high voltage to the gap to produce a gap ionization and high power at a lower voltage to the gap to produce a high current electrical discharge across the gap for a maximum stock removal, and means tuned to a frequency having a predetermined relationship to the certain frequency of the source for storing stock removing energy from the source during the entire cycle of the source so as to reduce the influence of gap load variations on the source.

8. In electrical stock removal apparatus, the combination of conductive tool and workpiece electrodes spaced apart so as to form an ionizable gap therebetween, an A.C. source of alternating current voltage having a certain frequency, a transformer having the primary winding thereof energized by the source and including main, supplementary and burning current windings, means operative to cause the voltages from each winding to be applied sequentially across the gap, the supplementary winding being arranged to apply low power at a high voltage to the gap so as to produce a gap ionization, the main winding being arranged to apply high power and at a lower voltage to the gap so as to produce a high current electrical stock removing discharge thereacross and thereby achieve maximum stock removal rates, the burning current winding being arranged to apply a burning current voltage across the gap between each discharge for maintaining the gap ready to conduct at a voltage level less than required for a true gap breakdown so as to cause a wear inhibiting surface to be formed on the tool electrode and a resonant circuit also energized by and tuned to the certain frequency of the source and operative to store stock removing energy during the entire cycle and thereby reduce the influence of gap load variations on the source.

9. In electrical stock removal apparatus, the combination of conductive tool and workpiece electrodes spaced apart so as to form a dielectric fluid filled gap therebetween, a source of alternating current voltage, a transformer having a low impedance primary winding energized by the source and main and supplementary secondary windings connected across the gap, the supplementary winding being arranged to apply initially a high voltage to the gap to produce ionization of the dielectric fluid within the gap, a voltage dividing network including an impedance in series with the supplementary winding, the main winding being arranged to provide a lower voltage than the voltage from the supplementary winding, the voltage dividing network being operative when the gap ionizes to cause the voltage from the supplementary winding to be dropped across the series impedance until the voltage from the supplementary winding approaches the voltage from the main winding and thus provide a high impedance to current flow from the supplementary winding so that the main winding becomes effective to supply voltage to the gap and cause a high current electrical stock removing discharge to occur across the gap.

10. In electrical stock removal apparatus, the combination of conductive tool and workpiece electrodes spaced apart so as to form a dielectric fluid filled gap therebetween, a source of alternating current voltage, a low impedance transformer having the primary winding thereof energized by the source and supplementary and main secondary windings arranged in parallel and each connected across the gap, a voltage dividing network including an impedance in parallel with both the main and supplementary secondary windings and a current limiting impedance in series with the supplementary winding, the supplementary winding being effective to initially apply a high voltage to the gap to produce ionization of the gap, the voltage dividing network being operative when the gap ionizes to cause the voltage from the supplementary winding to approach the voltage from the main winding due to the voltage drop across the current limiting impedance and thus present a high impedance to current flow from the supplementary winding so that the main winding becomes subsequently effective to apply the low voltage to the gap and cause a high current electrical stock removing discharge to occur across the gap thereby achieving maximum stock removal rates.

11. In electrical stock removal apparatus, the combination of conductive tool and workpiece electrodes spaced apart so as to form a dielectric fluid filled gap therebetween, a source of alternating current voltage, a low impedance transformer having a primary winding energized by the source and main and supplementary secondary windings arranged in parallel with respect to each other and connected across the gap, unidirectional conducting devices associated with each winding for changing the alternating voltage therefrom to a unidirectional voltage before applying to the gap, the supplementary winding being arranged to apply initially a high voltage to the gap so as to initiate a gap ionization, a voltage dividing network including an impedance in parallel with both the main and supplementary windings and a current limiting impedance in series with the supplementary winding, the main winding being arranged to apply a lower voltage than the voltage from the supplementary winding across the gap, the voltage dividing network being operative when the gap ionizes to cause the voltage from the supplementary winding to approach the voltage from the main winding due to the voltage drop across the series impedance and thus present a high impedance to current flow from the supplementary winding so that the main winding becomes subsequently effective to supply the low voltage to the gap and cause a high current electrical stock removing discharge to occur across the gap thereby achieving maximum stock removal rates.

12. In electrical stock removal apparatus, the combination of conductive tool and workpiece electrodes spaced apart so as to form an ionizable gap therebetween, an A.C. source, means coupling the A.C. source across the gap and adapted to apply thereto firing voltage, machining voltage and burning current voltage pulses of amplitudes, respectively, for producing a gap ionization, for producing a high current electric stock removing discharge across the gap, and for maintaining the gap ready to conduct after the discharge so as to cause any particles within the gap to melt and form a hardened layer of material on the cutting tool electrode, the coupling means including means phase relating the pulses so that the high voltage and the machining voltage pulses are in phase and the burning current voltage pulses occur between the in-phase firing voltage and machining voltage pulses.

13. In electrical stock removal apparatus, the combination of conductive tool and workpiece electrodes spaced apart so as to form an ionizable gap therebetween, an A.C. source of voltage and means coupling the source across the gap, the coupling means including means transforming the voltage from the source into a series of voltages of different amplitudes and means rectifying and phase relating the series of voltages so as to provide unidirectional voltage pulses having a certain phase relationship for causing during one half-cycle of the source the gap to be ionized and then a high current electrical stock removing discharge to be generated across the gap, and during the next half-cycle of the source the gap to be maintained at a voltage less than that required to produce the high current electrical discharges for causing any material bridging the gap and touching the cutting tool electrode to be melted and thereby form a hardened layer of material on the cutting tool for decreasing the wear thereof.

14. In electrical stock removal apparatus; the combination of conductive tool and workpiece electrodes spaced apart so as to form an ionizable gap therebetween; a source of A.C. voltage; a transformer having a primary winding energized by the source and firing voltage, machining voltage and burning current voltage secondary windings arranged to provide respectively a firing voltage of a relatively high magnitude for initially ionizing the gap, a machining voltage of a lower magnitude than the firing voltage for causing a high current electrical stock removing discharge to occur across the gap, and a burning current voltage of a magnitude lower than the machining voltage and sufficient to maintain the gap voltage at a level less than required for the high current electrical discharge thereby causing particles within the gap to melt and adhere to the cutting tool electrode surface to protect the cutting tool electrode against wear; and means operative to cause the firing voltage, machining voltage and burning current voltage to be applied sequentially across the gap; the means including firing voltage, machining voltage and burning current voltage rectifiers each in series respectively with the firing voltage, machining voltage and burning current voltage windings so as to provide corresponding unidirectional voltage pulses, and a voltage dividing network having an impedance in series with the firing voltage winding and operative when the gap ionizes to cause the firing voltage to be dropped across the series impedance until the firing voltage approaches the machining voltage and thus provides a high impedance path to current flow from the firing voltage winding so that the machining voltage winding is rendered effective to apply the machining voltage across the gap, the rectifiers being so poled with respect to each other that the firing voltage and the machining voltage pulses are in-phase and the burning current voltage pulses are 180° out of phase with the in-phase firing voltage and machining voltage pulses.

15. In electrical stock removal apparatus; the combination of cutting tool and workpiece electrodes; means maneuvering the electrodes relative to each other; an A.C. source; means coupling the A.C. source across the gap and adapted to apply thereto firing voltage, machining voltage, and burning current voltage pulses of amplitudes, respectively, for producing a gap ionization, for producing a high current electrical stock removing discharge across the gap, and for maintaining the gap ready to conduct after the discharge so as to cause any particles within the gap to melt and form a hardened layer of material on the cutting tool electrode; the coupling means including means phase relating the pulses so that the firing voltage and the machining voltage pulses are in-phase and the burning current voltage pulses occur between the in-phase firing voltage and machining voltage pulses; means controlling the maneuvering means; the controlling means including a source of reference voltage, means sensing gap voltage and providing a corresponding gap feedback voltage, means comparing the reference voltage with the gap feedback voltage to obtain an error signal voltage corresponding to variations in the gap voltage from the reference voltage and applying the error signal voltage to the maneuvering means so as to cause a predetermined gap to be maintained between the electrodes, and means altering the sensitivity of the controlling means to variations in the gap feedback voltage so as to alter the rates at which the electrodes are maneuvered by the maneuvering means.

16. In electrical stock removal apparatus; the combination of conductive cutting tool and workpiece electrodes; means maneuvering the electrodes relative to each other; an A.C. source of voltage; means coupling the source across the gap; the coupling means including means transforming the voltage from the source into a series of voltages of different amplitudes and means rectifying and phase relating the series of voltages so as to provide unidirectional voltage pulses having a certain phase relationship for causing during one half-cycle of the source the gap to be ionized and then a high current electrical stock removing discharge to be generated across the gap, and during the next half-cycle of the source the gap to be maintained at a voltage less than that required to produce the high current electrical discharges for causing particles within the gap to melt and form a hardened layer of material on the cutting tool electrode for reducing the wear thereof; and means controlling the maneuvering means; the controlling means including a reference voltage source, means sensing gap voltage and providing a corresponding gap feedback voltage, means comparing the reference voltage and the gap feedback voltage and developing an error signal voltage therefrom corresponding to variations in the gap from a predetermined gap and applying the error signal voltage to the maneuvering means to cause the predetermined gap to be maintained, and means varying the sensitivity of the controlling means to variations in the gap feedback voltage so as to alter the rate at which the maneuvering means moves the electrodes relative to each other.

17. In electrical stock removal apparatus, the combination of conductive tool and workpiece electrodes spaced apart so as to form an ionizable gap therebetween, an A.C. source of voltage, means coupling the A.C. source across the gap, the coupling means including means transforming the source voltage into a series of voltages of different amplitudes and means rectifying and phase relating the series of voltages so as to provide unidirectional voltage pulses having a certain phase relationship for causing during one half-cycle of the source a stock removing discharge across the gap and for causing during the next half-cycle of the source the gap to be maintained ready to conduct at a voltage level less than that required for a stock removing discharge so as to cause any material within the gap to melt and form a hardened layer of material on the cutting tool electrode.

References Cited by the Examiner
UNITED STATES PATENTS

| | | | |
|---|---|---|---|
| 2,882,437 | 4/59 | McKechnie | 314—61 |
| 2,927,191 | 3/60 | Matulaitis | 219—69 |
| 2,966,574 | 12/60 | Maillet | 219—69 |
| 2,984,761 | 5/61 | Webb | 314—61 |
| 3,052,817 | 9/62 | Branker | 219—69 X |
| 3,068,352 | 12/62 | Correy | 219—137 |
| 3,098,149 | 7/63 | Inoue | 219—69 |

RICHARD M. WOOD, *Primary Examiner.*